No. 750,142. PATENTED JAN. 19, 1904.
C. WILSON.
SEAT FOR FARM MACHINERY.
APPLICATION FILED JUNE 4, 1903.
NO MODEL.

WITNESSES.
D. E. Carlsen
E. C. Carlsen

INVENTOR.
Caesar Wilson
BY his ATTORNEY
A. M. Carlsen

No. 750,142. Patented January 19, 1904.

UNITED STATES PATENT OFFICE.

CAESAR WILSON, OF GREENLEAF, MINNESOTA.

SEAT FOR FARM MACHINERY.

SPECIFICATION forming part of Letters Patent No. 750,142, dated January 19, 1904.

Application filed June 4, 1903. Serial No. 160,066. (No model.)

*To all whom it may concern:*

Be it known that I, CAESAR WILSON, a citizen of the United States, residing at Greenleaf, in the county of Meeker and State of Minnesota, have invented certain new and useful Improvements in Seats for Farm Machinery; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in seats for drivers, and has especial reference to seats used on farm machinery like mowers, reapers, and wheeled cultivators, harrows, plows, &c. It is a well-known fact that after long riding on such machinery in the field with the ordinary seats heretofore used the driver does not only get very tired, but usually also gets backache and sideache for want of support at any side of the body above the seat.

The object of my invention is to overcome the said imperfection with such seats. This object I attain by the novel construction and arrangement of parts illustrated in the accompanying drawings, in which—

Figure 1:
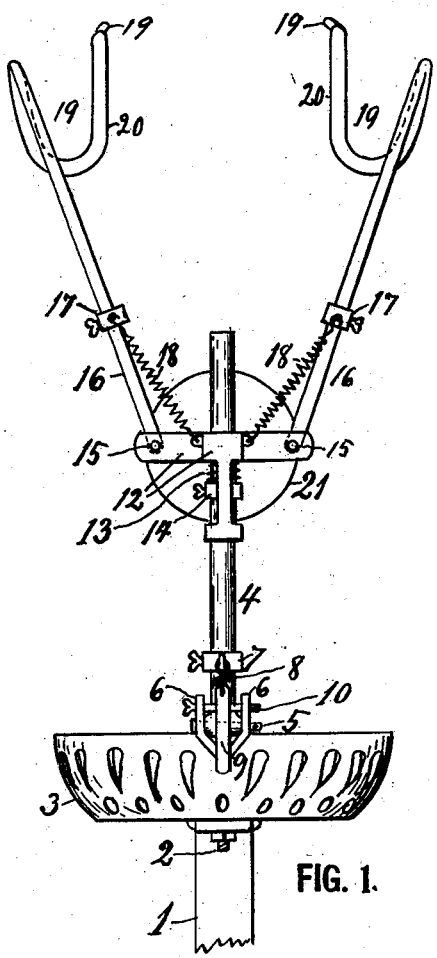
Figure 2:
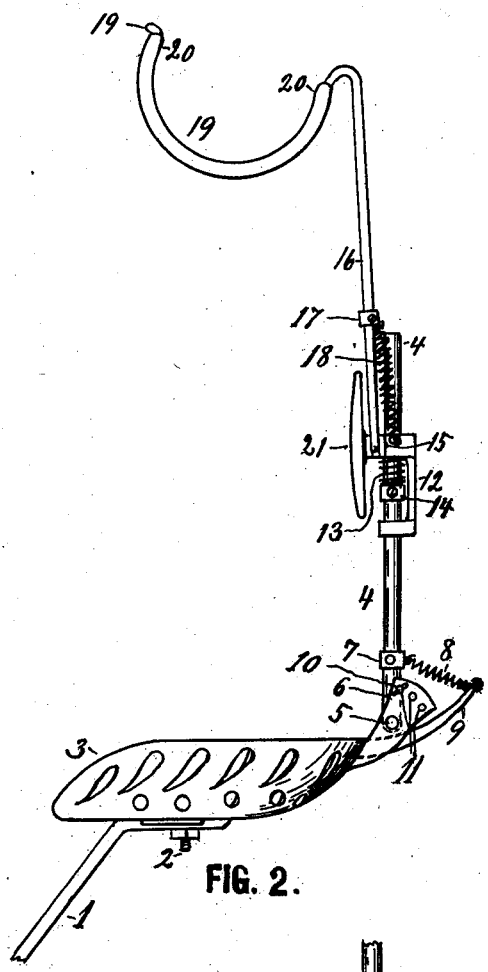
Figure 4:
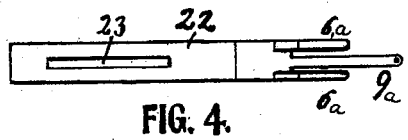
Figure 3:
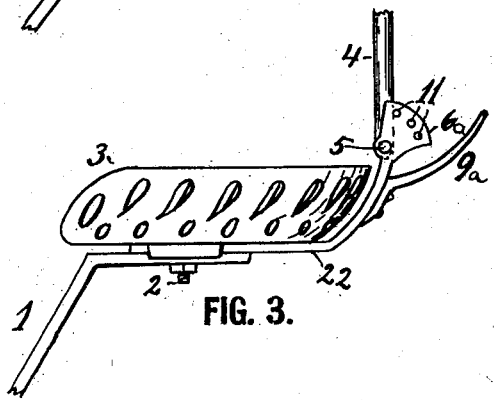

Figure 1 is a rear elevation of a harvester-seat provided with my improvements. Fig. 2 is a side elevation of Fig. 1. Fig. 3 is a portion of Fig. 2 so modified as to show my improvements applied as an attachment to seats already made. Fig. 4 is a detail top view of the arm 22 in Fig. 3.

Referring to the drawings by reference-numerals, 1 designates the usual spring-arm projecting upward from the frame of a harvester or like machine and holding secured by a bolt 2 the driver's seat 3.

In Figs. 1 and 2 is shown how my body-supporting device may be mounted in projections cast integral with the seat. In said views a standard 4 has its lower end secured on a pivot 5, passed through the cheek-plates 6, formed at the rear of the seat, and upon the standard is a set-screwed collar 7, from which extends a coiled spring 8 to the arm 9, projecting also from the seat. The spring 8 holds the standard normally against a pin 10, which may be put into either of the holes 11 in the cheek-plates, and thus cause the standard to stand upright or to lean backward or forward. Upon the standard is a small sliding frame 12, supported on a spring 13, resting on a set-screwed collar 14, so that the frame may easily be adjusted vertically to fit the height of a small or big person on the seat. To the sliding frame 12 are pivoted at 15 two arms 16, having set-screwed collars 17, connected to the central portion of the sliding frame by springs 18, which tend to draw the arms toward each other with their upper ends. Said upper ends are formed into arm-rests 19, which are covered by cushions 20. Upon the front side of the sliding frame 12 is secured a soft pad 21, against which the back of the driver rests, while the rests 19 grasp or take under the arms close by the body.

From the above description it will be understood that when the driver is in the seat 3 and his arms (at the armpits) rest in the hooks or rests 19 the pad 21 touches his back and prevents the forward bent position, which causes the pain in the sides and back, and the spring 8 counterbalances the forward weight of the body, and thus saves the muscles from carrying it and thereby becoming sore and painful. It will be observed, however, that the driver is free to lean forward to operate levers or for any purpose, as the spring 8 will yield to such wilful movements of the driver. He may also lean to either side, as the pivots 15 allow for that, and he may turn all that is necessary in the seat, as the sliding frame will turn on the standard.

The tension to the springs 18 may be changed by moving of the collars 17, and by moving the collar 7 the tension of the spring 8 is regulated.

In applying this device to seats already in use or ready for use I provide a frame-arm 22, having a preferably slotted hole 23, to go on the bolt 2 of the seat. The arm may go either below or, as in Fig. 3, above the spring-arm 1. It may also be secured to the rear edge of the seat in any suitable manner. The arm 9ª may be made integral with the arm 22, as shown in Fig. 3, or be secured to it, and the cheeks 6ᵃ are preferably formed integral with said bar 22.

The device may be applied also to seats used in locomotives, cars, and vehicles of all kinds for drivers and other riders and even for stationary seats for various operators.

Having thus described my invention, what I claim, and desire to secure by Letters Patent, is—

1. A seat having a vertically-adjustable back-rest and arm-supports pivoted thereto and provided with springs tending to close them together.

2. A seat having a standard pivoted adjacent to and projecting upward from the rear of the seat, a spring tending to draw the standard rearward and means for stopping the action of the spring at various points; a revoluble vertically-adjustable spring-supported frame on the standard, a back-rest and pivoted arm-rests carried by said frame.

3. A seat having a standard pivoted adjacent to and projecting upward from the rear of the seat, a spring tending to draw the standard rearward and means for stopping the action of the spring at various points; a revoluble vertically-adjustable spring-supported frame on the standard, a back-rest and pivoted arm-rests carried by said frame, and springs with adjustable tension holding said arm-rests toward the occupant of the seat.

4. The combination with a seat, of an attachment securable to the seat or to its support and comprising a suitable frame-piece, a rearwardly-spring-held standard pivoted thereto with its lower end, a vertically-adjustable, spring-supported, revoluble frame or piece upon the standard, and a back-rest and two arm-rests carried thereby, and means for stopping the rearward swinging of the standard.

In testimony whereof I affix my signature in presence of two witnesses.

CAESAR WILSON.

Witnesses:
A. M. CARLSEN,
D. E. CARLSEN.